United States Patent
Ng et al.

(10) Patent No.: US 10,192,016 B2
(45) Date of Patent: Jan. 29, 2019

(54) NEURAL NETWORK BASED PHYSICAL SYNTHESIS FOR CIRCUIT DESIGNS

(71) Applicant: Xilinx, Inc., San Jose, CA (US)

(72) Inventors: Aaron Ng, Santa Clara, CA (US); Sabyasachi Das, San Jose, CA (US); Prabal Basu, Logan, UT (US)

(73) Assignee: XILINX, INC., San Jose, CA (US)

( * ) Notice: Subject to any disclaimer, the term of this patent is extended or adjusted under 35 U.S.C. 154(b) by 122 days.

(21) Appl. No.: 15/407,875

(22) Filed: Jan. 17, 2017

(65) Prior Publication Data
US 2018/0203956 A1 Jul. 19, 2018

(51) Int. Cl.
*G06F 17/50* (2006.01)

(52) U.S. Cl.
CPC ........ *G06F 17/505* (2013.01); *G06F 17/5054* (2013.01); *G06F 17/5068* (2013.01); *G06F 17/5081* (2013.01); *G06F 2217/78* (2013.01); *G06F 2217/84* (2013.01)

(58) Field of Classification Search
CPC .................................................. G06F 17/5054
USPC .................................................. 716/101, 104
See application file for complete search history.

(56) References Cited

U.S. PATENT DOCUMENTS

| | | | | |
|---|---|---|---|---|
| 5,046,020 A | * | 9/1991 | Filkin | G06N 3/08 706/25 |
| 5,121,467 A | * | 6/1992 | Skeirik | G05B 13/029 706/10 |
| 5,140,530 A | * | 8/1992 | Guha et al. | G06N 3/086 706/13 |
| 5,200,908 A | * | 4/1993 | Date et al. | G06F 17/5072 706/19 |
| 5,228,113 A | * | 7/1993 | Shelton | G06N 3/084 706/25 |
| 5,278,945 A | * | 1/1994 | Basehore et al. | G06N 3/063 706/41 |
| 5,465,204 A | | 11/1995 | Sekine et al. | |
| 9,026,964 B2 | * | 5/2015 | Mohanty et al. | G06F 17/5036 716/104 |
| 2007/0256046 A1 | | 11/2007 | Pikus et al. | |
| 2014/0089880 A1 | | 3/2014 | Haller et al. | |

OTHER PUBLICATIONS

Altera, "Netlist Optimization and Physical Synthesis," Quartus II Handbook (QII52007-13.1.0), version 13.1, Nov. 2013, pp. 16-1 to 16-16, Altera Corporation, now Intel Corporation, Santa Clara, California, USA.

(Continued)

*Primary Examiner* — Sun Lin
(74) *Attorney, Agent, or Firm* — Kevin T. Cuenot

(57) ABSTRACT

Physical synthesis for a circuit design can include determining, using a processor, features relating to a signal path of the circuit design not meeting a timing requirement, processing the features through a first neural network model using the processor, wherein the first neural network model is trained to indicate an effectiveness of a first physical synthesis optimization, and selectively performing, using the processor, the first physical synthesis optimization for the signal path based upon a result from the first neural network model.

20 Claims, 2 Drawing Sheets

(56) References Cited

OTHER PUBLICATIONS

Altera, "Timing Closure and Optimization," Quartus II Handbook (QII2005-13.1.0), version 13.1, Nov. 2013, pp. 12-2 to 12-6, Altera Corporation, now Intel Corporation, Santa Clara, California, USA.
Synopsys, "Synplify Premier" brochure, 2011, pp. 1-4, Synopsys, Inc., Mountain View, California, USA.
Yu, Bei et al., "Machine Learning and Pattern Matching in Physical Design," Proc. of the 20th Asia and South Pacific Design Automation Conference, Jan. 19, 2015, pp. 286-293.
Theocharides, T. et al., "A Generic Reconfigurable Neural Network Architecture Implemented as a Network on Chip," Proc. of the IEEE International SOC Conference, Sep. 12, 2004, pp. 191-194, IEEE, Piscataway, Nw Jersey, USA.
Qi, Zhongdong et al., "Accurate Prediction of Detailed Routing Congestion Using Supervised Data Learning," Proc. of the 2014 IEEE 32nd International Conference on Computer Design (ICCD), Oct. 19, 2014, pp. 97-103, IEEE, Piscataway, Nw Jersey, USA.
Nissen, Stephen, "Implementation of a Fast Artificial Neural Network library (FANN)," Oct. 31, 2003, pp. 1-92, Department of Computer Science, University of Copenhagen, København, Denmark.
"Tools and teamwork are key to successful PCB Design," Computer Design, Jun. 1, 1996, pp. 57-67, vol. 35, No. 7, Penwell Publ., Littleton, MA, USA.

\* cited by examiner

NEURAL NETWORK BASED PHYSICAL SYNTHESIS FOR CIRCUIT DESIGNS

TECHNICAL FIELD

This disclosure relates to integrated circuits (ICs) and, more particularly, to physical synthesis for circuit designs adapted for implementation within an IC.

BACKGROUND

Integrated circuits (ICs) can be implemented to perform a variety of functions. Some ICs can be programmed to perform specified functions. One example of an IC that can be programmed is a field programmable gate array (FPGA). An FPGA typically includes an array of programmable tiles. These programmable tiles may include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that may include, for example, function generators, registers, arithmetic logic, and so forth.

The programmable interconnect and programmable logic circuitries are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits, referred to as a configuration bitstream, provided to the device for that purpose. The data bits may be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs may also be implemented in other ways, e.g., using fuse or antifuse technology. The phrase "programmable IC" may include, but is not limited to, these devices and further may encompass devices that are only partially programmable. For example, one type of programmable IC includes a combination of hard-coded transistor logic and a programmable switch fabric that programmably interconnects the hard-coded transistor logic.

Creating circuit designs for implementation within a programmable IC such as an FPGA is a complex process. One reason for this complexity is the aggressive timing requirements, called "timing constraints," often set forth for the circuit designs. A significant amount of time is spent by designers in an attempt to create a circuit design that meets these aggressive timing constraints.

Typically, the timing of a circuit design may be expressed as slack measurements on a per signal path (path) basis. "Slack," in reference to a circuit design, is the difference between a required arrival time of a signal at a circuit element for a path, e.g., a signal arriving at a load of a net from the driver, and an estimated arrival time of the signal at the circuit element for the path. A positive slack indicates that the path meets the timing requirement for the path. The signal is estimated to arrive at the destination prior to the required arrival time specified by the timing requirement. A negative slack indicates that the path does not meet the timing requirement for the path. The estimated arrival time of a signal to the load of the path is after the required arrival time specified by the timing requirement.

SUMMARY

One or more embodiments are directed to methods of physical synthesis for a circuit design. In one aspect, a method can include determining, using a processor, features relating to a signal path of the circuit design not meeting a timing requirement, processing the features through a first neural network model using the processor, wherein the first neural network model is trained to indicate effectiveness of a first physical synthesis optimization, and selectively performing, using the processor, the first physical synthesis optimization for the signal path based upon a result from the first neural network model.

One or more embodiments are directed to systems for physical synthesis for a circuit design. In one aspect, a system includes a processor configured to initiate executable operations. The executable operations include determining features relating to a signal path of the circuit design not meeting a timing requirement, processing the features through a first neural network model, wherein the first neural network model is trained to indicate effectiveness of a first physical synthesis optimization, and selectively performing the first physical synthesis optimization for the signal path based upon a result from the first neural network model.

One or more embodiments are directed to computer program products for physical synthesis for a circuit design. In one aspect, a computer program product includes a computer readable storage medium having program code stored thereon. The program code is executable by a processor to perform operations including determining, using a processor, features relating to a signal path of the circuit design not meeting a timing requirement, processing the features through a first neural network model using the processor, wherein the first neural network model is trained to indicate effectiveness of a first physical synthesis optimization, and selectively performing, using the processor, the first physical synthesis optimization for the signal path based upon a result from the first neural network model.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
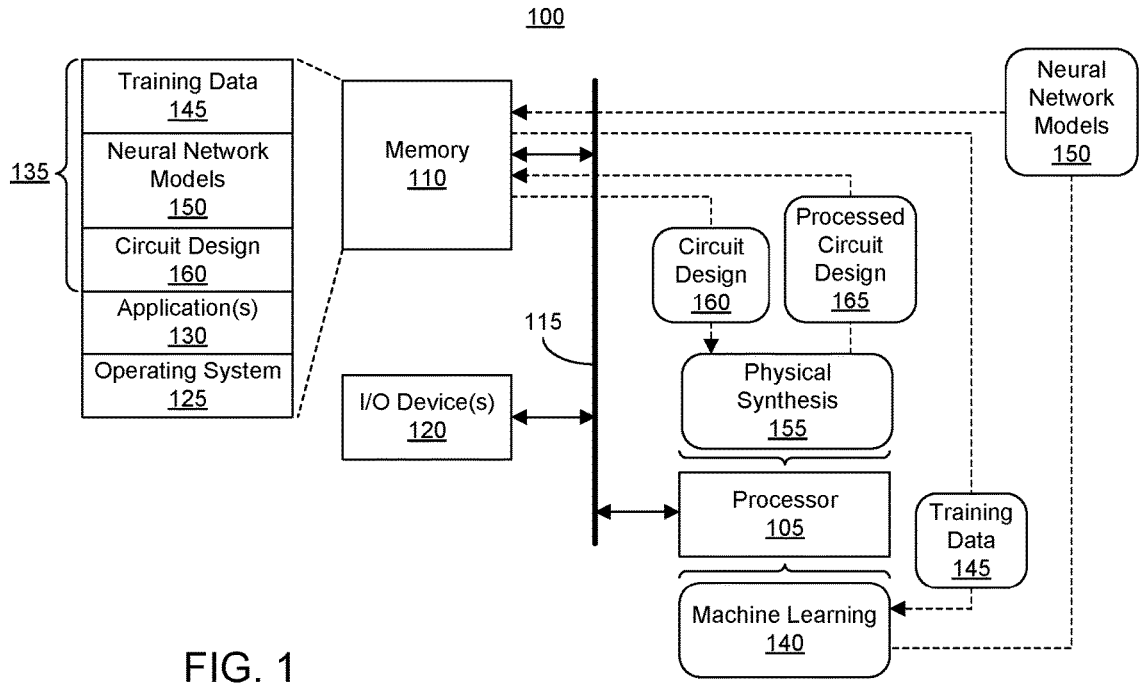
FIG. 1 illustrates an example system for performing physical synthesis.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to physical synthesis for circuit designs. One or more embodiments are directed to using artificial neural networks for purposes of performing physical synthesis processes on a circuit design. The circuit designs are adapted for implementation within ICs. For example, the circuit designs may be implemented within programmable ICs, application-specific ICs (ASICs), and so forth. Examples of programmable ICs can include, but are not limited to, field programmable gate arrays (FPGAs), complex programmable logic devices (CPLDs), system-on-chips which are characterized by the inclusion of a processor adapted to execute program code and programmable circuitry, etc.

Artificial neural networks, or simply "neural networks," refer to a computational architecture modeled after biological brains. Within a neural network, nodes referred to as neurons may be interconnected and operate collectively to process input data. Examples of different types of neural networks include, but are not limited to, Convolutional Neural Networks, Recurrent Neural Networks, Deep Belief Networks, Restricted Boltzman Machines, etc. A neural network may be used to extract "features" from complex input data. The neural network may include a plurality of layers. Each layer may receive input data and generate output data by processing the input data to the layer.

When implementing a circuit design within an IC, an electronic design automation (EDA) system processes the circuit design through a design flow. The term "design flow" means performing operations such as synthesis, mapping, placement, and routing on a circuit design. The EDA system may also perform configuration bitstream generation as part of the design flow in order to load the configuration bitstream into various types of ICs. At or near the end of the design flow, for example, after placement, the EDA system, or another design tool, may perform one or more physical synthesis optimizations on signal paths of the circuit design that do not meet established timing constraints. A physical synthesis optimization (hereafter "optimization technique") is one that is performed on a circuit design post placement or post routing. While particular examples of optimization techniques are described below, an optimization technique generally refers to a change in placement, routing, or both.

Conventional EDA systems are capable of applying a plurality of different optimization techniques to the circuit design to improve timing of signal paths that do not meet timing constraints (referred to as "critical" or "timing critical" signal paths). Improving a signal path, as used herein, refers to improving an aspect or feature (e.g., a Quality of Result (QOR) as described below) for an instance (e.g., a circuit element such as a driver or load of a net and/or circuit element type), a pin, or a net of the signal path.

The particular optimization technique or combination of optimization techniques that will actually improve the timing of a signal path or QOR of the circuit design is not known prior to actually performing the optimization technique on the signal path and then measuring the result. In most cases, however, application of optimization techniques to the circuit design result in degraded performance of the circuit design as opposed to improved performance. After performing an optimization technique that is rejected as unsuccessful, the EDA system discards the changes and reverts to the state of the circuit design prior to application of the optimization technique. Thus, any time spent performing an unsuccessful optimization technique is effectively wasted.

In cases where the QOR is of the utmost importance, a conventional EDA system may attempt each available type of optimization technique on the circuit design. This approach, however, may result in unacceptably long runtimes. Conventional EDA systems may attempt to reduce runtime for performing optimization technique(s). This typically occurs at the expense of QOR, e.g., resulting in a lesser QOR.

Accordingly, one or more embodiments described within this disclosure are directed to using neural networks to determine whether to apply optimization techniques to the circuit design. The system may evaluate a result obtained from executing a neural network model and selectively apply the optimization technique to the signal path based upon the result generated using the neural network model.

The embodiments described herein are not dependent upon the particular type of optimization technique being considered. Rather, the embodiments can be used to determine when to perform any of a variety of different optimization techniques to signal paths of a circuit design. The system may apply only those optimization techniques that are considered likely to generate a higher QOR. Similarly, the system is capable of skipping or omitting those optimization techniques considered unlikely to generate a higher QOR. Accordingly, the system is capable of minimizing runtime by skipping selected optimization techniques considered to generate a lower QOR and/or maximize QOR by performing those optimization techniques considered likely to generate higher QOR.

One or more embodiments are directed to a method of using a neural network model to implement a circuit design and/or perform physical synthesis on the circuit design as performed by a data processing system. One or more embodiments are directed to a system that is adapted to use a neural network model to implement a circuit design and/or perform physical synthesis on the circuit design. One or more embodiments are directed to a computer program product including a computer readable storage medium having program code stored thereon for using a neural network model to implement a circuit design and/or perform physical synthesis on the circuit design.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example data processing system (system) 100 for performing physical synthesis. System 100 is an example implementation of an EDA system that is adapted to perform the various operations described within this disclosure. System 100 includes at least one processor 105 coupled to a memory 110 through interface circuitry 115. Interface circuitry 115 may be implemented as, for example, an input/output (I/O) subsystem, an I/O interface, a bus system, a memory interface, or other suitable circuitry. System 100 stores computer readable instructions (also referred to as "program code") within memory 110. Memory 110 may be considered an example of computer readable storage media. Processor 105 executes the program code accessed from memory 110 via interface circuitry 115.

Memory 110 can include one or more physical memory devices such as, for example, a local memory and one or more bulk storage devices. Local memory refers to random access memory (RAM) or other non-persistent memory device(s) generally used during actual execution of the program code. A bulk storage device may be implemented as a hard disk drive (HDD), solid state drive (SSD), or other persistent data storage device. System 100 may also include one or more cache memories (not shown) that provide temporary storage of at least some program code in order to reduce the number of times program code must be retrieved from the bulk storage device during execution.

System 100 may be coupled to one or more I/O devices 120. Examples of I/O devices 120 can include, but are not limited to, a keyboard, a display device, a pointing device, one or more network adapters, and so forth. A network adapter enables system 100 to become coupled to other systems, computer systems, remote printers, and/or remote storage devices. Examples of network adapters may include, but are not limited to, modems, Ethernet cards, bus adapters, wireless transceivers and/or radios, and so forth. System 100 may include one or more additional I/O device(s) beyond the examples provided. The I/O devices described herein may be coupled to system 100 either directly or through intervening I/O controllers.

As pictured, memory 110 may store an operating system 125, one or more application(s) 130, and various different types of data 135. Application 130, for example, may be an EDA application. In one or more embodiments, application 130 is adapted to perform physical synthesis inclusive of optimization techniques as described within this disclosure. In one or more embodiments, application 130 is adapted to perform one or more or all stages of a design flow that includes physical synthesis. In one aspect, operating system 125 and application 130, being implemented in the form of executable program code, are executed by system 100 and, more particularly, by processor 105, to perform the various operations described within this disclosure. As such, operating system 125 and application 130 may be considered an integrated part of system 100.

Operating system 125, application 130, and any data (e.g., data 135) used, generated, and/or operated upon by system 100 are functional data structures that impart functionality when employed as part of system 100 or are provided to an IC for implementation therein. A "data structure" refers to a physical implementation of a data model's organization of data within a physical memory. As such, a data structure is formed of specific electrical or magnetic structural elements in a memory. A data structure imposes physical organization on the data stored in the memory for use by a processor.

System 100 may include fewer components than shown or additional components not illustrated in FIG. 1 depending upon the particular type of device that is implemented. In addition, the particular operating system and/or application(s) included may vary according to device type as may the types of network adapter(s) included. Further, one or more of the illustrative components may be incorporated into, or otherwise form a portion of, another component. For example, a processor may include at least some memory.

The example of FIG. 1 illustrates two different phases. During one phase, system 100, or another system similar to system 100, is capable of performing machine learning 140. System 100 is capable of performing machine learning 140 using training data 145. In one aspect, training data 145 includes a plurality of training circuit designs, features of the training circuit designs prior to application of any physical synthesis optimizations, and features of the training circuit designs after application of one or more different optimization techniques.

Processor 105 is capable of performing machine learning 140, e.g., neural network training, using training data 145 to generate neural network models 150. In one or more embodiments, processor 105 is capable of generating a neural network model 150 for each different optimization technique that may be performed during physical synthesis. Machine learning 140 is described in greater detail with reference to FIG. 2.

In a second or different phase, system 100 is capable of performing physical synthesis 155. In the example of FIG. 1, processor 105 is capable of reading circuit design 160 from memory 110 and operating on circuit design 160 by performing one or more phases of a design flow. Circuit design 160 (and circuit design 165 described below) may be specified using a hardware description language, as a register transfer level (RTL) representation, as a netlist, etc.

Processor 105 is further capable of performing one or more optimization techniques on circuit design 160 as described herein using one or more of neural network models 150. Processor 105, in operating on circuit design 160, generates a different version of circuit design 160 that is output and shown as circuit design 165. Circuit design 165 is functionally equivalent to circuit design 160 but differs in that system 100 has performed one or more optimization techniques on circuit design 160 thereby generating circuit design 165.

For purposes of illustration, consider an example where circuit design 160 has undergone synthesis, optionally logical optimization, and placement as part of a design flow. Circuit design 160 has not yet been routed. Circuit design 160 includes one or more signal paths that are not considered timing critical. The term "signal path," as defined herein, means a portion of a circuit design that has synchronous driver circuit element and one or more synchronous load circuit elements. The signal path may also include one or more asynchronous circuit elements between the driver (e.g., or source) and the load(s).

System 100 is capable of selecting a signal path from within circuit design 160 that is not meeting a timing requirement. System 100 further is capable of determining whether to apply one or more optimization techniques to the signal path in an effort to achieve an improved QOR. System 100 is capable of determining one or more features of the circuit design, providing the features as inputs to a neural network model 150, and executing neural network model 150. Based upon a result obtained from execution of neural network model 150, the system determines whether to apply the optimization technique to the signal path.

QOR may be measured in any of a variety of ways. In one or more embodiments, improved QOR is improved timing for the signal path. Improved timing means that the slack of the signal path is less negative so that the signal path is less timing critical or no longer timing critical. In another example, improved QOR may mean that the number of signal paths failing to meet timing in the circuit design and/or IC is reduced.

Another example QOR is whether the power consumption of the circuit design and/or IC improves (e.g., is reduced). When using power consumption as a measure of QOR, evaluation of power consumption may be applied to the circuit design or IC as a whole, to particular modules or other hotspots that consume more than a threshold amount of power, or the like. Another example QOR is area usage of the circuit design and/or IC where a reduction in area usage is an improvement in QOR. It should be appreciated that QOR may be any of the foregoing examples or a combination of one or more or all of the foregoing examples. For instance, QOR may be determined by applying a weight to one or more or all of the individual QOR quantities described and summing the weighted quantities. In one or more embodiments, whether a result of a given optimization technique is maintained or rejected is determined based upon the QOR obtained.

As defined herein, the term "neural network model" means an implementation of a trained artificial neural network that is executable by a data processing system and/or a specialized neural network processor. In one or more embodiments, the neural network model is implemented as processor-executable program code, e.g., object code, stored as a data structure. In one example, the neural network model may implement a feed forward neural network. In a feedforward neural network, the neurons of the neural network have links to other neurons. The links only extend in one direction, i.e., the forward direction, through the neural network.

In one or more embodiments, system 100 is capable of performing a plurality of different optimization techniques. Example optimization techniques include, but are not limited to, a change to the netlist of circuit design 160, a change to a timing constraint of circuit design 160, a placement change for circuit design 160, and/or a routing change to circuit design 160 in cases where circuit design 160 is routed. For one or more or each of the examples provided, system 100 may be configured to perform a plurality of more specific optimization techniques, e.g., system 100 may be able to perform two or more different types of netlist changes, two or more placement changes, etc. In this regard, additional examples of optimization techniques include, but are not limited to, remapping, restructuring, rewiring, push and/or pull techniques, replication, signal reordering, retiming, instance (e.g., lookup table) insertion, etc.

System 100 may generate and store a neural network model 150 for each of the different types of optimization techniques that system 100 is able to perform. System 100 may provide the features of the signal path to one or more of neural network models 150 for the optimization techniques and perform those optimization techniques on the signal path in response to determining that a result of executing neural network models 150 indicates at least a minimum likelihood of improvement in QOR. For example, each neural network model 150 is adapted to indicate the likely effectiveness of a particular optimization technique. Thus, those optimization techniques that are unlikely to result in improved QOR may be skipped or omitted during physical synthesis based upon results from execution of neural network model(s) 150.

In one or more embodiments, system 100 is capable of using neural network models 150 for determining which signal paths to process and/or an order of signal paths to process to obtain an improved QOR. For example, system 100 may choose not to perform optimization techniques on a signal path where neural network models 150 indicate a low likelihood of improved QOR. In other cases, system 100 may choose to operate on those signal paths indicated to have a high likelihood of improved QOR prior operating on those signal paths indicated to have a low likelihood of improved QOR.

In one or more embodiments, system 100 is capable of determining an order in which optimization techniques are to be applied to a given signal path in order to improve QOR. For example, system 100 may evaluate a plurality of optimization techniques using neural network models 150 and apply those optimization techniques to a particular signal path that are likely to result in an improved QOR prior to those physical synthesis optimizations likely to result in less improvement in QOR.

Figure 2:
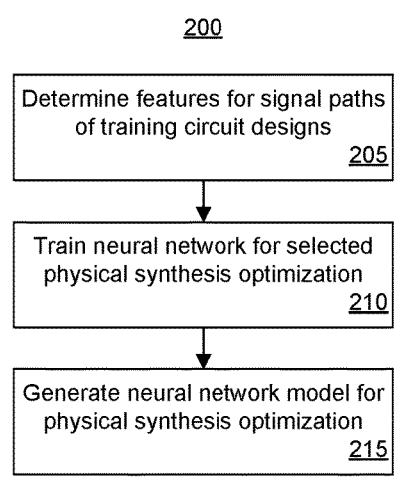
FIG. 2 illustrates an example method of generating neural network models.

FIG. 2 illustrates an example method 200 of generating neural network models. FIG. 2 illustrates an example method of performing machine learning as described in connection with FIG. 1 to train a neural network and generate a neural network model. Method 200 may be performed using a data processing system having an architecture that is the same as, or similar to, system 100 of FIG. 1.

Method 200 may be performed by a system to create a neural network model adapted to determine the likelihood that application of a particular optimization techniques to a signal path will result in improved QOR. Since method 200 is directed to generating one neural network model corresponding to a particular optimization technique, it should be appreciated that method 200 may be repeated as needed to generate further neural network models for other particular optimization techniques and/or for each optimization technique that a given EDA system is capable of performing.

In one or more embodiments, a neural network library may be used to generate the neural network model. One example of a neural network library that may be used is the "Fast Artificial Neural Network" or "FANN" available from the University of Copenhagen, Department of Computer Science. The examples provided herein are for purposes of illustration and not limitation. It should be appreciated that other neural network libraries may be used to generate neural network models.

In block 205, features (e.g., training data 145) relating to timing critical signal paths from a plurality of training circuit designs are determined. For example, from a library of circuit designs, timing critical signal paths can be identified. For each of the identified signal paths, a plurality of features may be determined prior to application of the selected optimization technique. Subsequent to application of the optimization technique, one or more additional features are determined including whether the optimization technique is accepted or rejected. In an embodiment, for purposes of training, whether the optimization is accepted or rejected may be a determination made by a designer, e.g., a user. In another embodiment, for purposes of training, whether the optimization is accepted or rejected may be a determined according to a QOR as described herein. The QOR may be determined automatically by the system.

Examples of the features determined in block 205 as part of the training data can include, but are not limited to:

Name of the optimization technique (fanout optimization, placement optimization, retiming, rewire, retiming, DSP-optimization, BRAM-optimization etc.);

Type of driver instance (e.g., the type of circuit element of the driver or source of the signal path such as lookup table, flip-flop, etc.);

Number of pins of the driver (larger numbers of input pins are generally correlated with reduced likelihood of improving the QOR);

Number of unique types of loads for the driver (larger numbers of loads for the driver are generally correlated with reduced likelihood of improving QOR);

Number of load pins;

Net fanout for the signal path;

Local net slack before optimization (e.g., the slack of the net prior to optimization);

Local net slack after optimization (e.g., the slack of the net post optimization);

Global design slack before optimization (e.g., the signal path having the most negative slack of the circuit design prior to optimization);

Global design slack after optimization (e.g., the signal path having the most negative slack of the circuit design after optimization);

Net Manhattan distance of driver/load pins;

Net bounding box size of 1-hop neighbor pins (e.g., the rectangular shape sized to include the current instance/net and the location of each connecting pin to the current instance/net);

Number of control sets. A control set refers to two or more control pins of two or more different circuit components that are of a same control pin type and that are driven by a same control signal or a same instance of a driver circuit component. A control set can be a unique set of control and/or clock nets for sequential circuit components such as flip-flops, latches, slice RAMs, and so forth. Two circuit components are in a same control set when each of the two circuit components has a same control pin type (e.g., set, reset, clock enable, clear) that is driven by a same signal and/or a same driver circuit component (e.g., different instances of a same circuit component). The number of control sets refers to the number of unique combinations of such pins within the circuit design and/or IC. Not all flip-flops have each type of control signal;

Placement density around net to optimize. Placement density refers to congestion around the net. As an illustrative example, if there are 100 locations around the net and 80 of the locations are occupied by some logic element, the placement density will be 80% or 0.8;

Control set density around net to optimize. Control set density refers to control set congestion around the net. As an illustrative example, the IC may include 10 slices surrounding a slice (e.g., a portion of a logic block) of the current net. If 10 slices can accommodate a total of 40 control nets and the design is using 20 control sets in the 10 slices, the control set density is 50% or 0.5; and Optimization move accepted or rejected?

As illustrated above, particular ones of the features relate to the circuit design in general or to regions in and around the signal path being evaluated, while other ones of the features relate to the specific signal path being evaluated. One or more or all of the above-described features may be used to train the neural network.

In an embodiment, each of the example inputs above can be normalized to a continuous scale of −1 to 1, both inclusive. Each of the example inputs has an impact upon the success or failure of the attempted optimization technique. Further, while the features described above have a correlation with the success rate of the selected optimization technique, the features may have little correlation with one another.

For purposes of illustration, consider the case where the system has approximately 200,000 data points. Each data point may be a timing critical signal path and have values for each of the above features (e.g., 15 inputs and one output). The system performs a machine learning process to build a neural network model. Machine learning enables the combination of multiple features to create a stronger unified model, as long as each feature has little correlation with each other feature. For the output value, a successful optimization technique (e.g., one that is accepted) is indicated by a +1, while a failed attempt (e.g., one that is rejected) is indicated by a −1.

As noted, the neural network is trained individually for each of the available optimization techniques. As illustrated above, the particular optimization technique for which the neural network is trained may be specified as the first of the features listed. For example, during a first iteration of method 200, each of the data points is for a fanout optimization technique to generate a neural network model, e.g., a trained neural network, for the fanout optimization technique. During a second iteration of method 200, each of the data points is for a placement optimization technique to generate a neural network model for the placement optimization technique, etc.

In block 210, the system trains the neural network for the selected optimization technique. In the training phase, the system builds the neural network model by determining the coefficients of different layers and/or nodes. The neural network model includes an input layer, an output layer, and one or more hidden layers. In one or more embodiments, the neural network model includes two hidden layers. The particular number of hidden layers used, however, is not intended as a limitation of the embodiments described herein. The layers may be implemented as fully connected layers.

In one aspect, the system may train the neural network to a point where the weights of the neural network have converged or substantially converged. For example, the training process of block 210 may determine a set of weights that provides the neural network with the desired input-output relationship. As an illustrative example, a learning process can adjust the weights of the neural network repeatedly to change the input-output relationship so that an input-output accuracy cost function is optimized. In this way, the goal of a training process is to change the input-output relationship of the neural network.

In block 215, the system generates the neural network model. For example, the system is capable of outputting program code that may be executed by a system for determining the likelihood that performing the selected physical synthesis technique on a signal path will result in an improvement in QOR. The neural network model is generated using this training process through experimenting with a large number of training circuit designs. Once generated, the neural network model may be executed to generate a floating point value to predict probability of acceptance or rejection of a specific optimization attempt.

After building and testing, the neural network models may be incorporated into the EDA system in order to operate on user circuit designs. The EDA system is capable of determining whether to perform a selected optimization technique on the circuit design for a given signal path based upon a result obtained from executing the neural network model for the selected optimization technique.

FIG. 2 is provided for purposes illustration and, as such, is not intended to limit the arrangements described herein to the particular examples provided. In one or more embodiments, a neural network may be trained by using power consumption and/or power management features of the circuit design so that execution of the neural network model provides a value that predicts the likelihood of the power consumption of the circuit design or portions thereof being reduced from application of a particular optimization technique. In one or more other embodiments, the neural network model may be trained to consider both power consumption and timing as described herein with reference to QOR to provide a value that predicts the likelihood of both power consumption and timing of the circuit design (or portions thereof) being improved.

Figure 3:
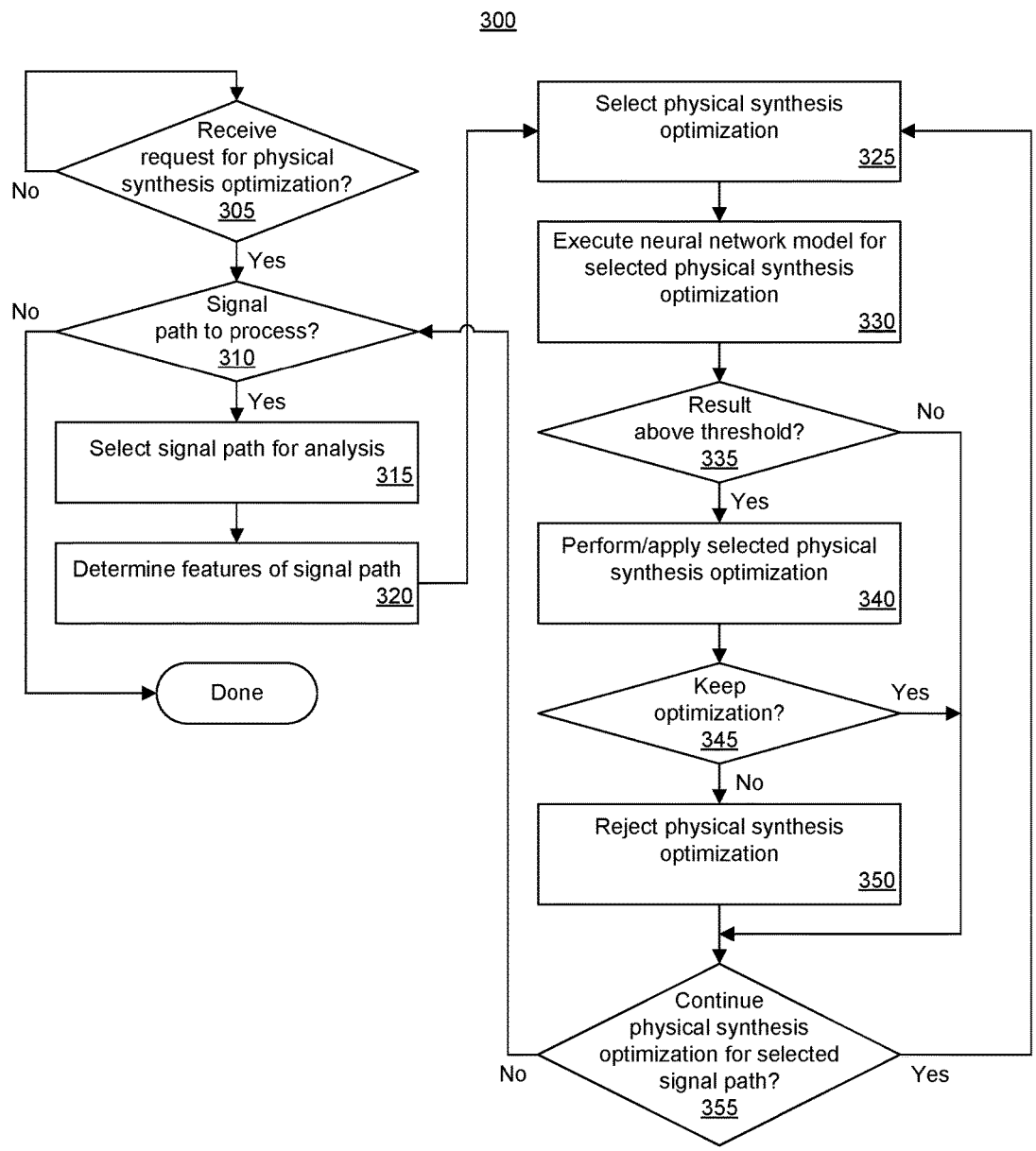
FIG. 3 illustrates an example method of performing physical synthesis.

FIG. 3 illustrates an example method 300 of performing physical synthesis. Method 300 may be performed by a system as described with reference to FIG. 1. Method 300 may begin in a state where the system stores a plurality of neural network models, where each neural network model is adapted to estimate likelihood of improvement in QOR from applying a particular optimization technique.

In block 305, the system determines whether a request for physical synthesis optimization is received. If so, method 300 continues to block 310. If not, method 300 may continue to loop as shown. For example, a designer may be creating or editing a circuit design. In one or more embodiments, the circuit design may be placed. In one or more embodiments, the circuit design may be placed and routed. In any case, the circuit design may include one or more signal paths that are timing critical. After performing one or more stages of the design flow, the designer may request that the EDA system perform optimization techniques.

In block 310, the system determines whether there are any signal paths to process. In particular, the system is capable of determining whether there are any signal paths that do not meet timing and that have not yet been optimized or considered for optimization. If so, method 300 continues to block 315. If not, method 300 may end.

In block 315, the system is capable of selecting a signal path for analysis. For example, the system is capable of selecting a timing critical signal path. In one or more embodiments, the system may select the signal path with the most negative slack. In subsequent iterations of method 300, the system may continue to select timing critical signals in order of decreasing criticality (from most negative to least negative slack).

In block 320, the system determines a plurality of features of the circuit design relating to the signal path selected in block 315. In one or more embodiments, the system is capable of evaluating the selected signal path and determining one or more or all of the features below:
Type of driver instance;
Number of pins of the driver;
Number of unique types of loads for the driver;
Number of load pins;
Net fanout;
Local net slack before optimization;
Global design slack before optimization;
Net Manhattan distance of driver/load pins;
Net bounding box size of 1-hop neighbor pins;
Number of control sets;
Placement density around net to optimize; and
Control set density around net to optimize.

The example features listed above include those features described with reference to FIG. 2 with the exception of the features that are only determined after the application of the optimization technique. For example, features such as the resulting timing/slack after application the physical synthesis optimization are not used. Further, as each neural network model is adapted to a particular physical synthesis optimization, the type of physical synthesis optimization is not required as an input. In one or more embodiments, those features directed to post application of the optimization technique may be used for purposes of determining QOR and whether to accept an optimization if performed.

In block 325, the system selects an optimization technique for consideration. In block 330, the system executes the neural network model for the selected optimization technique. The system, for example, selects the neural network model for the selected optimization technique. The system is capable of executing the neural network model by providing the features determined in block 320 to the neural network model as inputs and processing the features through the neural network model. The system, in executing the neural network model, is capable of returning a floating point value indicating the likelihood that performing the selected optimization technique on the signal path will result in improved QOR.

In one or more embodiments, each of the various features provided as an input to the neural network model can be normalized to a value between −1 and +1 inclusive. In this regard, the result obtained from execution of the neural network model may also be of value between −1 and +1 inclusive. A result that is near −1 indicates that performing the selected optimization technique is very unlikely to improve QOR for the circuit design. A result that is near +1 indicates that performing the selected optimization technique is very likely to improve the QOR for the circuit design.

In block 335, the system is capable of determining whether the result obtained in block 330 is above a threshold value. If so, method 300 may continue to block 340 where the selected optimization technique is performed on the selected signal path of the circuit design. If not, method 300 may proceed to block 355. In that case, the system does not perform the selected optimization technique on the signal path.

In one or more embodiments, the system is capable of using a sliding threshold in block 335. The threshold may be adjusted or set as a system parameter or preference by the user. The higher the threshold, the more runtime for performing optimization techniques is reduced. A higher threshold results in performing fewer optimizations in general. The lower the threshold, the more that QOR improvement of the circuit design is maximized at the expense of longer runtime for performing optimization techniques.

In block 345, the system determines whether to keep the optimization that was performed in block 340. The system is capable of determining whether to keep the optimization based upon calculating a measure of QOR as described herein. QOR may be determined based upon improvement in timing as discussed herein, improvement in power consumption, or a combination of the two.

In another aspect, as noted, the system is capable of measuring improvement in any of the features of block 320 as a QOR for the selected optimization technique. Improvement in the feature indicates an improved QOR. Improvement in such features may be used in combination with any of the other quantities described herein as a QOR quantity such as timing related QOR quantities and/or power consumption QOR quantities (e.g., using weightings and/or summation) to generate a final QOR. The system determines whether to keep the optimization based upon whether the QOR (or final QOR as the case may be) improves. In response to determining that the QOR improves, method 300 continues to block 355. In response to determining that the QOR does not improve, method 300 proceeds to block 350.

In block 350, in response to determining that the QOR does not improve, the system rejects the physical synthesis optimization performed in block 340. The system, for example, returns the circuit design to the state that existed prior to the latest iteration of block 340.

In block 355, the system determines whether to continue with performing physical synthesis optimizations for the selected signal path. In response to a determination to continue, method 300 loops back to block 325 to select a next optimization technique to perform on the selected signal path. In response to a determination not to continue, method 300 loops back to block 310 to select a next signal for processing.

In one or more embodiments, the system is capable returning to block 310 to process a different signal path in response to determining that each optimization technique that the system is capable of performing has been evaluated with respect to the selected signal path. In another example, the system may continue to block 310 to process a different signal path in response to determining that the signal path now meets the timing constraint, e.g., is no longer timing critical. In one aspect, the system may continue to block 310 upon determining that the signal path meets timing whether or not each optimization technique has been evaluated for application to the selected signal path.

In one or more embodiments, the system is capable of performing a maximum number of optimization techniques on the selected signal path. The maximum number of optimization techniques may be set to the total number of optimization techniques or a number that is less than the total number of optimization techniques available. Accordingly, upon performing the maximum number of optimization techniques on the selected path, method 300 continues from block 355 to block 310.

For purposes of illustration, consider an example where the maximum number of optimization techniques is set to one. In that case, after performing block 340 one time on the selected signal path, method 300 leaves block 355 and proceeds to block 310. In this arrangement, optimization techniques that are not applied in consequence of the result from the neural network model being below the threshold are not counted. It should be appreciated that the maximum number of optimization techniques may be adjusted as a system setting. For example, the maximum number of optimization techniques may be set to 1, 2, 3, 4, etc.

In one or more embodiments, the system is capable of using neural network models to determine which signal paths to process and/or an order of signal paths to process to obtain an improved QOR. For example, the system is capable of evaluating a plurality of signal paths by processing features for each of the signal paths through one or more or all of the neural network models for the different optimization techniques. The system is capable of operating on the signal path that has the highest likelihood of improved QOR based upon the results from executing the neural network models. The system may then operate on the signal path with the second highest likelihood for improved QOR, and so forth.

In one or more embodiments, the system is capable of determining an order in which optimization techniques are to be applied to a given signal path in order to improve QOR. For example, the system may determine the features for a selected signal path and execute a plurality of the neural network models or each neural network model for the selected signal path. The system may perform the optimization technique with the highest likelihood of generating an improved QOR first. If required, e.g., the signal path is still timing critical, the system may perform the optimization technique with the second highest likelihood of generating an improved QOR, and so forth. The system may continue applying optimization techniques until the signal path is no longer timing critical, apply the top "N" optimization techniques where "N" is an integer value less than the total number of optimization techniques, apply each optimization technique having a result from execution of the associated neural network model that is above a threshold value, etc.

A circuit design processed as described herein may be implemented within an IC. In one or more embodiments, the circuit design may be processed by a system to generate a configuration bitstream that may be loaded into an IC to physically implement the circuitry described by the processed circuit design within the IC.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the term "another" means at least a second or more. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing.

Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

As defined herein, the term "output" means storing in physical memory elements, e.g., devices, writing to display or other peripheral output device, sending or transmitting to another system, exporting, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context. As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, a graphics processing unit (GPU), a controller, and so forth.

As defined herein, the term "user" means a human being. The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

One or more embodiments are directed to methods of physical synthesis for a circuit design. In one aspect, a method can include determining, using a processor, features relating to a signal path of the circuit design not meeting a timing requirement, processing the features through a first neural network model using the processor, wherein the first neural network model is trained to indicate effectiveness of a first physical synthesis optimization, and selectively performing, using the processor, the first physical synthesis optimization for the signal path based upon a result from the first neural network model.

In an aspect, the method includes processing the features through a second neural network model trained to indicate effectiveness of a second physical synthesis optimization and selectively applying the second physical synthesis optimization to the signal path based upon a result from the second neural network model.

In another aspect, the first physical synthesis optimization is performed for the signal path in response to determining that the result from the first neural network model exceeds a threshold.

In another aspect, the method includes training the first neural network model based, at least in part, upon improvement in slack of timing critical signal paths of a plurality of training circuit designs from applying the first physical synthesis optimization.

In another aspect, the features of the signal path are normalized and provided to the first neural network model as inputs.

In another aspect, the features of the signal path include a number of load pins of the signal path.

In another aspect, the features of the signal path include a number of pins of a driver of the signal path.

In another aspect, the features of the signal path include a type of circuit element of a driver of the signal path.

In another aspect, the method includes executing a plurality of neural network models prior to applying the first physical synthesis optimization to the signal path, wherein each neural network model corresponds to a particular physical synthesis optimization, and selecting the first physical synthesis optimization based upon results of executing the plurality of neural network models.

In another aspect, an order of application of at least two of the physical synthesis optimizations to the signal path is determined from executing the plurality of neural network models.

One or more embodiments are directed to systems for physical synthesis for a circuit design. In one aspect, a system includes a processor configured to initiate executable operations. The executable operations include determining features relating to a signal path of the circuit design not meeting a timing requirement, processing the features through a first neural network model, wherein the first neural network model is trained to indicate effectiveness of a first physical synthesis optimization, and selectively performing the first physical synthesis optimization for the signal path based upon a result from the first neural network model.

In an aspect, the first physical synthesis optimization is performed for the signal path in response to determining that the result from the first neural network model exceeds a threshold.

In another aspect, the features of the signal path are normalized and provided to the first neural network model as inputs.

In another aspect, the features of the signal path include a number of load pins of the signal path.

In another aspect, the features of the signal path include a number of pins of a driver of the signal path.

In another aspect, the features of the signal path include a type of circuit element of a driver of the signal path.

In another aspect, the processor is configured to initiate executable operations further including executing a plurality of neural network models prior to applying the first physical synthesis optimization to the signal path, wherein each neural network model corresponds to a particular physical synthesis optimization, and selecting the first physical synthesis optimization based upon results of executing the plurality of neural network models.

In another aspect, an order of application of at least two of the physical synthesis optimizations to the signal path is determined from executing the plurality of neural network models.

One or more embodiments are directed to computer program products for physical synthesis for a circuit design. In one aspect, a computer program product includes a computer readable storage medium having program code stored thereon. The program code is executable by a processor to perform operations including determining, using a processor, features relating to a signal path of the circuit design not meeting a timing requirement, processing the features through a first neural network model using the processor, wherein the first neural network model is trained to indicate effectiveness of a first physical synthesis optimization, and selectively performing, using the processor, the first physical synthesis optimization for the signal path based upon a result from the first neural network model.

In an aspect, the first physical synthesis optimization is performed for the signal path in response to determining that the result from the first neural network model exceeds a threshold.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of physical synthesis for a circuit design, the method comprising:
    determining, using a processor, features relating to a signal path of the circuit design not meeting a timing requirement;
    processing the features through a first neural network model using the processor, wherein the first neural network model is trained to indicate an effectiveness of a first physical synthesis optimization; and
    selectively performing, using the processor, the first physical synthesis optimization for the signal path based upon a result from the first neural network model.

2. The method of claim 1, further comprising:
    processing the features through a second neural network model trained to indicate an effectiveness of a second physical synthesis optimization; and
    selectively applying the second physical synthesis optimization to the signal path based upon a result from the second neural network model.

3. The method of claim 1, wherein the first physical synthesis optimization is performed for the signal path in response to determining that the result from the first neural network model exceeds a threshold.

4. The method of claim 1, further comprising:
    training the first neural network model based, at least in part, upon an improvement in slack of timing critical signal paths of a plurality of training circuit designs from applying the first physical synthesis optimization.

5. The method of claim 1, wherein the features of the signal path are normalized and provided to the first neural network model as inputs.

6. The method of claim 1, wherein the features of the signal path include a number of load pins of the signal path.

7. The method of claim 1, wherein the features of the signal path include a number of pins of a driver of the signal path.

8. The method of claim 1, wherein the features of the signal path include a type of a circuit element of a driver of the signal path.

9. The method of claim 1, further comprising:
    executing a plurality of neural network models prior to applying the first physical synthesis optimization to the signal path, wherein each neural network model of the plurality of neural network models corresponds to a particular physical synthesis optimization; and
    selecting the first physical synthesis optimization based upon results of executing the plurality of neural network models.

10. The method of claim 9, wherein an order of application of at least two synthesis optimizations to the signal path is determined from executing the plurality of neural network models.

11. A system for physical synthesis for a circuit design, the system comprising:
    a processor configured to initiate executable operations including:
    determining features relating to a signal path of the circuit design not meeting a timing requirement;
    processing the features through a first neural network model, wherein the first neural network model is trained to indicate an effectiveness of a first physical synthesis optimization; and
    selectively performing the first physical synthesis optimization for the signal path based upon a result from the first neural network model.

12. The system of claim 11, wherein the first physical synthesis optimization is performed for the signal path in response to determining that the result from the first neural network model exceeds a threshold.

13. The system of claim 11, wherein the features of the signal path are normalized and provided to the first neural network model as inputs.

14. The system of claim 11, wherein the features of the signal path include a number of load pins of the signal path.

15. The system of claim 11, wherein the features of the signal path include a number of pins of a driver of the signal path.

16. The system of claim 11, wherein the features of the signal path include a type of a circuit element of a driver of the signal path.

17. The system of claim 11, wherein the processor is configured to initiate executable operations further including:
    executing a plurality of neural network models prior to applying the first physical synthesis optimization to the signal path, wherein each neural network model of the plurality of neural network models corresponds to a particular physical synthesis optimization; and
    selecting the first physical synthesis optimization based upon results of executing the plurality of neural network models.

18. The system of claim 17, wherein an order of application of at least two synthesis optimizations to the signal path is determined from executing the plurality of neural network models.

19. A computer program product comprising a computer readable storage medium having program code stored thereon, the program code executable by a processor to perform operations comprising:
    determining, using the processor, features relating to a signal path of a circuit design not meeting a timing requirement;
    processing the features through a first neural network model using the processor, wherein the first neural network model is trained to indicate effectiveness of a first physical synthesis optimization; and
    selectively performing, using the processor, the first physical synthesis optimization for the signal path based upon a result from the first neural network model.

20. The computer program product of claim 19, wherein the first physical synthesis optimization is performed for the signal path in response to determining that the result from the first neural network model exceeds a threshold.

* * * * *